F. STARIN.
CAGE FOR BALL BEARINGS.
APPLICATION FILED DEC. 3, 1915.
1,190,035.
Patented July 4, 1916.
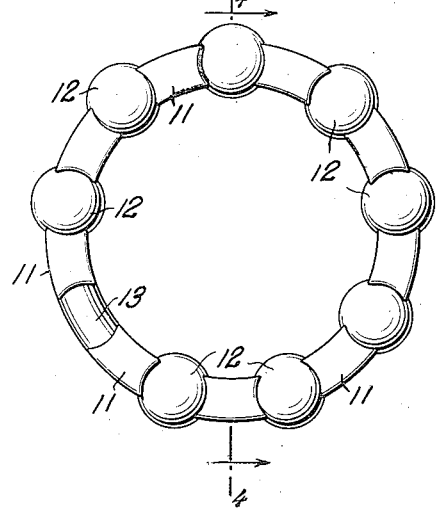
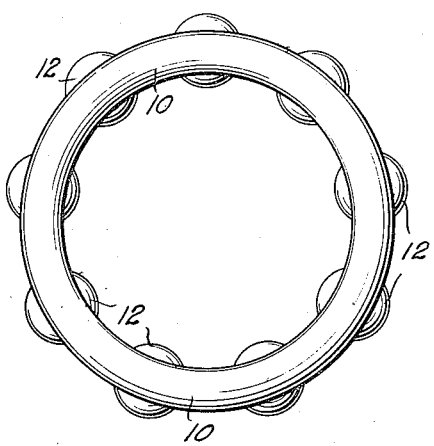
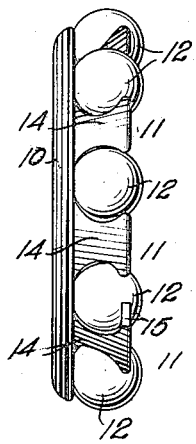
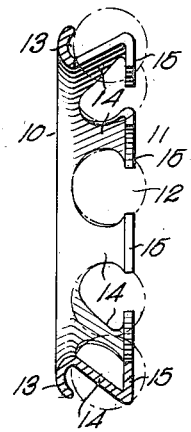
WITNESSES
INVENTOR
Frank Starin
BY
ATTORNEYS

UNITED STATES PATENT OFFICE.

FRANK STARIN, OF SPRINGFIELD, MASSACHUSETTS.

CAGE FOR BALL-BEARINGS.

1,190,035.

Specification of Letters Patent.

Patented July 4, 1916.

Application filed December 3, 1915. Serial No. 64,828.

*To all whom it may concern:*

Be it known that I, FRANK STARIN, a subject of the Emperor of Austria-Hungary, and a resident of Springfield, in the county of Hampden and State of Massachusetts, have invented a new and Improved Cage for Ball-Bearings, of which the following is a full, clear, and exact description.

The object of the invention is to provide a new and improved cage for ball bearings arranged to securely confine the balls in position in the cage at the same time allowing free rotation thereof.

In order to produce the desired result, use is made of a cage ring and spaced retaining lugs extending integrally from the inner edge of one face of the said ring in an outward oblique direction relatively to the plane of the ring, each lug terminating at its outer end in an inwardly extending flange approximately parallel with the plane of the ring, the opposite edges of adjacent lugs being concave for receiving and retaining a ball between them and allowing free rotation thereof.

A practical embodiment of the invention is represented in the accompanying drawings forming a part of this specification, in which similar characters of reference indicate corresponding parts in all the views.

Figure 1 is a face view of the cage with the balls in position thereon; Fig. 2 is a rear face view of the same; Fig. 3 is an edge view of the same; and Fig. 4 is a transverse section of the same with the balls shown in dotted lines, the section being on the line 4—4 of Fig. 1.

The cage in its general construction consists of a ring 10 and retaining lugs 11 integral with the ring and spaced apart to retain a ball 12 between adjacent retaining lugs. The inner face 13 of the ring 10 is concave and each retaining lug 11 consists of a shank 14 and a flange 15, of which the shank 14 is integrally connected with the inner edge of the said concave face 13 and extends outwardly at an obtuse angle relatively to the plane of the ring 10. The flange 15 of each retaining lug 11 extends from the outer end of the shank 14 in an inward direction approximately parallel to the plane of the ring 10. The side edges of each shank 14 of a retaining lug 11 are concave and the side edges of each flange 15 of a retaining lug 11 are likewise concave to hold a ball 12 between adjacent retaining lugs and allow free rotation thereof.

By reference to Figs. 3 and 4, it will be noticed that the diameter of a ball 12 is somewhat in excess of the distance between the concave face 13 of the ring 10 and the outer face of a flange 15, and the distance between the concave edges of adjacent lugs 15 is less than the diameter of the ball 12 confined between adjacent retaining lugs 11.

By the arrangement described the balls 12 project beyond the outer edges of the ring 10 and beyond the outer faces of the flanges 15 to allow the balls to make contact either at the top, bottom or the front according to the use of the ball bearing.

It is understood that the balls 12 can be readily swung in place between adjacent lugs owing to the resiliency of the latter, and the cage may be readily struck up from a single blank thus permitting very economical manufacture of the bearing.

Having thus described my invention, I claim as new and desire to secure by Letters Patent:

1. A cage for ball bearings consisting of a ring and spaced retaining lugs extending integrally from the inner edge of one face of the said ring in an outward oblique direction relative to the plane of the ring, and terminating at its outer end in an inwardly extending flange approximately parallel with the plane of the said ring, the opposite edges of adjacent lugs being concave for receiving and retaining a ball between them and allowing free rotation thereof.

2. A cage for ball bearings consisting of a ring having one face concave, and spaced retaining lugs each having a shank and a flange, the shank being integrally connected with the inner edge of the said concave ring face and extending outwardly at an obtuse angle from the said concave ring face, the said flange extending from the outer edge of the shank in an inward direction and standing approximately parallel to the plane of the ring, the opposite edges, the shank and flanges of adjacent lugs being concaved for receiving and retaining a ball and allowing the free rotation thereof.

In testimony whereof I have signed my name to this specification in the presence of two subscribing witnesses.

FRANK STARIN.

Witnesses:
WINFIELD SCOTT LEE,
LADISLAUS MARKUS.